(12) United States Patent
Horovitz et al.

(10) Patent No.: US 12,101,575 B2
(45) Date of Patent: Sep. 24, 2024

(54) VIDEO SUPPORT IN A MULTI-APERTURE MOBILE CAMERA WITH A SCANNING ZOOM CAMERA

(71) Applicant: Corephotonics Ltd., Tel-Aviv (IL)

(72) Inventors: Nitzan Horovitz, Tel Aviv (IL); Yoav Kurtz, Tel Aviv (IL); Adi Falik, Tel Aviv (IL); Omri Levi, Tel Aviv (IL); Ruthy Katz, Tel Aviv (IL); Michael Scherer, Tel Aviv (IL); Noy Cohen, Tel Aviv (IL); Oren Zohar, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 17/829,628

(22) PCT Filed: Dec. 24, 2021

(86) PCT No.: PCT/IB2021/062305
§ 371 (c)(1),
(2) Date: Jun. 1, 2022

(87) PCT Pub. No.: WO2022/137213
PCT Pub. Date: Jun. 30, 2022

(65) Prior Publication Data
US 2023/0336683 A1 Oct. 19, 2023

Related U.S. Application Data

(60) Provisional application No. 63/130,655, filed on Dec. 26, 2020.

(51) Int. Cl.
*H04N 5/268* (2006.01)
*H04N 5/262* (2006.01)
(Continued)

(52) U.S. Cl.
CPC .......... *H04N 5/268* (2013.01); *H04N 5/2628* (2013.01); *H04N 23/45* (2023.01); *H04N 23/635* (2023.01);
(Continued)

(58) Field of Classification Search
CPC .... H04N 5/268; H04N 23/635; H04N 23/683; H04N 23/667; H04N 23/69; H04N 23/80; H04N 23/45; H04N 5/2628
See application file for complete search history.

(56) References Cited

U.S. PATENT DOCUMENTS

| 4,199,785 A | 4/1980 | McCullough et al. |
| 5,005,083 A | 4/1991 | Grage et al. |

(Continued)

FOREIGN PATENT DOCUMENTS

| CN | 101276415 A | 10/2008 |
| CN | 201514511 U | 6/2010 |

(Continued)

OTHER PUBLICATIONS

Wang et al. "A Deep Network Solution for Attention and Aesthetics Aware Photo Cropping", IEEE vol. 41 No. 7, Jul. 2019.*

(Continued)

*Primary Examiner* — James T Boylan
(74) *Attorney, Agent, or Firm* — Nathan & Associates; Menachem Nathan (57) ABSTRACT

Systems and methods for obtaining a seamless, smooth transition between a Wide field of view (FOV) camera and a scanning Tele camera by correcting prism aberrations, matching Tele and Wide FOVs, localizing the associated Tele FOV, and zooming a Wide frame towards the localized Tele FOV.

5 Claims, 5 Drawing Sheets

(51) Int. Cl.
*H04N 23/45* (2023.01)
*H04N 23/63* (2023.01)
*H04N 23/667* (2023.01)
*H04N 23/68* (2023.01)
*H04N 23/69* (2023.01)
*H04N 23/80* (2023.01)

(52) U.S. Cl.
CPC ......... *H04N 23/667* (2023.01); *H04N 23/683* (2023.01); *H04N 23/69* (2023.01); *H04N 23/80* (2023.01)

(56) References Cited

U.S. PATENT DOCUMENTS

| | | |
|---|---|---|
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,657,402 A | 8/1997 | Bender et al. |
| 5,682,198 A | 10/1997 | Katayama et al. |
| 5,768,443 A | 6/1998 | Michael et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,208,765 B1 | 3/2001 | Bergen |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 * | 11/2015 | Shabtay ............. G02B 27/0075 |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0240052 A1 | 12/2004 | Minefuji et al. |
| 2005/0013509 A1 | 1/2005 | Samadani |
| 2005/0046740 A1 | 3/2005 | Davis |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0170793 A1 | 8/2006 | Pasquarette et al. |
| 2006/0175549 A1 | 8/2006 | Miller et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |

(56) References Cited

U.S. PATENT DOCUMENTS

| | | |
|---|---|---|
| 2007/0126911 A1 | 6/2007 | Nanjo |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0196001 A1 | 8/2010 | Ryynänen et al. |
| 2010/0238327 A1 | 9/2010 | Griffith et al. |
| 2010/0259836 A1 | 10/2010 | Kang et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164108 A1* | 7/2011 | Bates ............... H04N 23/00 348/36 |
| 2011/0164172 A1 | 7/2011 | Shintani et al. |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | WNakabayashi et al. |
| 2011/0242286 A1 | 10/2011 | Pace et al. |
| 2011/0242355 A1 | 10/2011 | Goma et al. |
| 2011/0298966 A1 | 12/2011 | Kirschstein et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0155176 A1 | 6/2013 | Paripally et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0270419 A1 | 10/2013 | Singh et al. |
| 2013/0278785 A1 | 10/2013 | Nomura et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0160311 A1 | 6/2014 | Hwang et al. |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0138381 A1 | 5/2015 | Ahn |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0353008 A1 | 12/2016 | Osborne |
| 2016/0353012 A1 | 12/2016 | Kao et al. |
| 2017/0019616 A1 | 1/2017 | Zhu et al. |
| 2017/0070731 A1 | 3/2017 | Darling et al. |
| 2017/0150061 A1 | 5/2017 | Shabtay et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0242225 A1 | 8/2017 | Fiske |
| 2017/0289458 A1 | 10/2017 | Song et al. |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0183982 A1 | 6/2018 | Lee et al. |
| 2018/0184010 A1* | 6/2018 | Cohen ............... H04N 23/62 |
| 2018/0198829 A1 | 7/2018 | Tang et al. |
| 2018/0241922 A1 | 8/2018 | Baldwin et al. |
| 2018/0295292 A1 | 10/2018 | Lee et al. |
| 2018/0300901 A1 | 10/2018 | Wakai et al. |
| 2019/0121103 A1 | 4/2019 | Bachar et al. |
| 2019/0121216 A1* | 4/2019 | Shabtay ............... H04N 23/61 |
| 2019/0155002 A1* | 5/2019 | Shabtay ............... G02B 13/02 |
| 2019/0213710 A1* | 7/2019 | Roulet ............... H04N 23/69 |

(56) References Cited

U.S. PATENT DOCUMENTS

| | | | |
|---|---|---|---|
| 2020/0103726 A1 | 4/2020 | Shabtay et al. | |
| 2020/0106964 A1 | 4/2020 | Cohen et al. | |
| 2020/0118287 A1 | 4/2020 | Hsieh et al. | |
| 2020/0221026 A1 | 7/2020 | Fridman et al. | |
| 2021/0185198 A1* | 6/2021 | Attar | H04N 23/695 |
| 2021/0368104 A1 | 11/2021 | Bian et al. | |
| 2022/0060674 A1* | 2/2022 | Kim | H04N 13/239 |

FOREIGN PATENT DOCUMENTS

| | | |
|---|---|---|
| CN | 102739949 A | 10/2012 |
| CN | 103024272 A | 4/2013 |
| CN | 103841404 A | 6/2014 |
| EP | 1536633 A1 | 6/2005 |
| EP | 1780567 A1 | 5/2007 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2002010276 A | 1/2002 |
| JP | 2003298920 A | 10/2003 |
| JP | 2004133054 A | 4/2004 |
| JP | 2004245982 A | 9/2004 |
| JP | 2005099265 A | 4/2005 |
| JP | 2006191411 A | 7/2006 |
| JP | 2006238325 A | 9/2006 |
| JP | 2007228006 A | 9/2007 |
| JP | 2007306282 A | 11/2007 |
| JP | 2008076485 A | 4/2008 |
| JP | 2010204341 A | 9/2010 |
| JP | 2011085666 A | 4/2011 |
| JP | 2013106289 A | 5/2013 |
| KR | 20070005946 A | 1/2007 |
| KR | 20090058229 A | 6/2009 |
| KR | 20100008936 A | 1/2010 |
| KR | 20140014787 A | 2/2014 |
| KR | 101477178 B1 | 12/2014 |
| KR | 20140144126 A | 12/2014 |
| KR | 20150118012 A | 10/2015 |
| WO | 2000027131 A2 | 5/2000 |
| WO | 2004084542 A1 | 9/2004 |
| WO | 2006008805 A1 | 1/2006 |
| WO | 2010122841 A1 | 10/2010 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |
| WO | WO 2018167581 * | 9/2018 |

OTHER PUBLICATIONS

International Search Report and Written Opinion in related PCT application PCT/IB2021/062305, dated Mar. 25, 2022.

European Search Report in related EP application 21909699.7, dated May 17, 2023.

Statistical Modeling and Performance Characterization of a Real-Time Dual Camera Surveillance System, Greienhagen et al., Publisher: IEEE, 2000, 8 pages.

A 3MPixel Multi-Aperture Image Sensor with 0.7μm Pixels in 0.11μm CMOS, Fife et al., Stanford University, 2008, 3 pages.

Dual camera intelligent sensor for high definition 360 degrees surveillance, Scotti et al., Publisher: IET, May 9, 2000, 8 pages.

Dual-sensor foveated imaging system, Hua et al., Publisher: Optical Society of America, Jan. 14, 2008, 11 pages.

Defocus Video Matting, McGuire et al., Publisher: ACM SIGGRAPH, Jul. 31, 2005, 11 pages.

Compact multi-aperture imaging with high angular resolution, Santacana et al., Publisher: Optical Society of America, 2015, 10 pages.

Multi-Aperture Photography, Green et al., Publisher: Mitsubishi Electric Research Laboratories, Inc., Jul. 2007, 10 pages.

Multispectral Bilateral Video Fusion, Bennett et al., Publisher: IEEE, May 2007, 10 pages.

Super-resolution imaging using a camera array, Santacana et al., Publisher: Optical Society of America, 2014, 6 pages.

Optical Splitting Trees for High-Precision Monocular Imaging, McGuire et al., Publisher: IEEE, 2007, 11 pages.

High Performance Imaging Using Large Camera Arrays, Wilburn et al., Publisher: Association for Computing Machinery, Inc., 2005, 12 pages.

Real-time Edge-Aware Image Processing with the Bilateral Grid, Chen et al., Publisher: ACM SIGGRAPH, 2007, 9 pages.

Superimposed multi-resolution imaging, Carles et al., Publisher: Optical Society of America, 2017, 13 pages.

Viewfinder Alignment, Adams et al., Publisher: EUROGRAPHICS, 2008, 10 pages.

Dual-Camera System for Multi-Level Activity Recognition, Bodor et al., Publisher: IEEE, Oct. 2014, 6 pages.

Engineered to the task: Why camera-phone cameras are different, Giles Humpston, Publisher: Solid State Technology, Jun. 2009, 3 pages.

Office Action in related KR patent application 2022-7012635, dated May 2, 2022.

Office Action in related CN patent application 202180013654.6, dated Oct. 12, 2023.

* cited by examiner

VIDEO SUPPORT IN A MULTI-APERTURE MOBILE CAMERA WITH A SCANNING ZOOM CAMERA

CROSS REFERENCE TO RELATED APPLICATIONS

This is a 371 application from international patent application No. PCT/IB2021/062305 filed Dec. 24, 2021, and claims the benefit of priority from U.S. Provisional patent application No. 63/130,655 filed Dec. 26, 2020, which is incorporated herein by reference in its entirety.

FIELD

Embodiments disclosed herein relate in general to mobile cameras and in particular to video support in multi-aperture cameras in the presence of a scanning camera

BACKGROUND

Multi-cameras, of which dual-cameras are a sub-category, are standard in modern mobile electronic handheld devices ("mobile devices", e.g. smartphone, tablet, etc.). A multi-camera usually comprises a Wide angle or field of view ($FOV_W$) camera ("Wide camera" or "WC"), and one or more additional cameras, either with a narrower FOV (Telephoto or "Tele" camera having a "native $FOV_T$" or "n-$FOV_T$") or with an Ultra-Wide FOV ($FOV_{UW}$).

"Scanning Tele cameras" ("STCs") cover or "scan" a segment of a scene that is larger than the n-$FOV_T$. This segment is referred to as "scanning Tele FOV" or "s-$FOV_T$". The FOV scanning may be performed by rotating one or more optical path folding elements ("OPFEs"). A STC is described for example in co-owned U.S. patent Ser. No. 10/578,948.

For dual-cameras including a WC and a Tele camera, while a user zooms in or out in a video operation mode (image stream), either a Wide or a Tele image is displayed to the user. When switching the "active" camera, i.e. switching the camera from which the output image is displayed (from Tele to Wide or vice versa), the user will see a "jump", or discontinuity in the video. This jump is amongst others caused by the different points of view (POVs) of the two or more cameras. A POV of a camera is defined as a unity vector and it is fully described by a point of origin and a direction. The point of origin is the center of the aperture of the respective camera. The POV's direction is given by the linear connection between the point of origin and the center of a particular FOV of the respective camera. In known dual-cameras included in mobile devices, the points of origin of the two cameras differ slightly by e.g. 5-25 mm.

A "smooth transition" (ST) in the displayed video is a software feature that minimizes the jump when switching between image streams of different cameras (having different POVs). In current multi-cameras, a center of $FOV_T$ is substantially identical with a center of $FOV_W$ (i.e. the center of $FOV_T$ and the center of $FOV_W$ are substantially identical). With respect to a mobile device such as a smartphone that includes the multi-camera, both the Wide camera's POV and the Tele camera's POV are substantially parallel to a normal on the smartphone's rear surface. However, for a STC, n-$FOV_T$ and POV are not fixed, but they scan within s-$FOV_T$. Therefore, in general a center of n-$FOV_T$ and a center of $FOV_W$ are not identical and, when included in a smartphone, the STC's POV is not parallel to a normal on the smartphone's rear surface.

There is need and it would be beneficial to have a smooth transition feature for smooth switching between Wide images ("WIs") and scanning Tele images ("STIs") within a video image stream.

SUMMARY

Disclosed herein are systems and methods for obtaining a smooth (i.e. seamless) transition between cameras or POVs that minimizes the jump effect occurring in a video operation mode when switching from displaying Wide image data to scanning Tele image data during zooming-in ("zoom-in") or when switching from displaying scanning Tele image data to Wide image data during zooming-out ("zoom-out"). Hereinafter and for simplicity, "Wide image data" may be replaced by just "Wide image" or "WI", and "scanning Tele image data" may be replaced by just "STC data", "scanning Tele image", or "STI".

In various examples, there are provided zoom cameras comprising: a Wide camera with a $FOV_W$ and operative to output Wide images (WIs); a STC with a Tele FOV (n-$FOV_T$) narrower than $FOV_W$ and operative to output STIs; and a camera controller operatively coupled to the Wide camera and to the STC and configured to stream a video image stream that displays a continuous zoom-in action into, or a continuous zoom-out action out off a non-center area within $FOV_W$, wherein the video images are provided with a smooth transition when switching from displaying WIs to displaying scanning STIs or vice versa.

In some examples, the smooth transition may be achieved by one or more of the following: performing a rotation correction of the STIs, executing registration between the WIs and the STIs, or executing a localization between the WIs and the STIs for performing position matching. The localization between the WIs and the STIs may improve the accuracy of the position matching with respect to the position matching before the localization by more than 2.5 times or even by more than 10 times.

In some examples, the smooth transition may be achieved by one of the following: shifting STIs relative to WIs according to a distance of an object in a scanning Tele image region of interest (ROI) when switching from displaying the WIs to displaying the STIs, and/or by shifting the WIs relative to the STIs according to a distance of an object in a Wide image ROI when switching from displaying the STIs to displaying the WIs; applying blurring on the WIs and/or the STIs; blending WIs and STIs; matching scale and/or brightness and/or color between WIs and STIs; or cropping WIs such that respective crop offsets of sequentially displayed WIs lie on a line. The cropping of the WIs may include cropping such that a distance between the respective crop offsets of sequentially displayed WIs changes linearly with a zoom factor, or cropping such that a distance between the respective crop offsets of sequentially displayed WIs changes according to a square of a zoom factor. A crop offset and/or a crop center and/or a crop factor may be selected such that a selected object is included in a cropped scanning Tele image displayed to a user. The selected object may be located at a particular position within the cropped scanning Tele image.

In some examples, the smooth transition may be achieved by cropping WIs such that respective coordinates of a $FOV_W$ center of sequentially displayed WIs lie on a line. The cropping of the WIs may include cropping such that a distance between the respective coordinates of the $FOV_W$ center of sequentially displayed WIs changes linearly with a zoom factor, or cropping such that a distance between the respective coordinates of the $FOV_W$ center of sequentially displayed WIs changes according to a square of the zoom factor.

In some examples, the smooth transition may be achieved by cropping of the WIs such that a particular target area is always displayed in the video image stream, or cropping WIs such that the respective coordinates of a particular target area in sequentially displayed WIs lie on a line. The cropping may be such that a distance between the respective coordinates of the particular target area in sequentially displayed WIs changes linearly, or according to a square law.

In some examples, the switching from displaying WIs to displaying STIs may be performed at an up-transfer ZF value ($ZF_{UP}$), wherein the switching from displaying STIs to displaying WIs is performed at a down-transfer ZF value ($ZF_{DOWN}$), and wherein $ZF_{UP} \geq ZF_{DOWN}$.

In some examples, the switching from displaying STIs to displaying WIs may be performed at a down-transfer ZF value ($ZF_{DOWN}$) that depends on a point-of-view (POV) of a native-$FOV_T$ (n-$FOV_T$) within the $FOV_W$, i.e. $ZF_{DOWN} = ZF_{DOWN}(x,y)$, wherein $ZF_{DOWN}$(center POV) is a down-transfer ZF value of a center POV within $FOV_W$, wherein $ZF_{DOWN}$(margin POV) is a down-transfer ZF value of a margin POV within $FOV_W$, and wherein $ZF_{DOWN}$(center POV)<$ZF_{DOWN}$(margin POV).

In some examples, the switching from displaying WIs to displaying STIs may be performed at an up-transfer ZF value ($ZF_{UP}$), wherein $ZF_{UP}$ does not depend on the POV of a native $FOV_T$ (n-$FOV_T$) within $FOV_W$, wherein $[ZF_{DOWN}(x,y)]_{MAX}$ is a maximal value of $ZF_{DOWN}(x,y)$ for all possible POVs within a scanning FOV (s-$FOV_T$) of the STC, wherein $ZF_{UP} \geq [ZF_{DOWN}(x,y)]_{MAX}$.

In some examples, the switching from displaying WIs to displaying STIs may be performed at a $ZF_{UP}$ that depends on a POV of a n-$FOV_T$ within the $FOV_W$, wherein $ZF_{UP} = ZF_{UP}(x,y)$.

In some examples, the switching from displaying WIs to displaying STIs may be performed at a $ZF_{UP}$ and the switching from displaying STIs to displaying WIs may be performed at $ZF_{DOWN}$, wherein the values of $ZF_{UP}$ and/or $ZF_{DOWN}$ in a video photography mode are 5%-30% larger than the values of $ZF_{UP}$ and/or $ZF_{DOWN}$ in a stills photography mode. The values of $ZF_{UP}$ and/or $ZF_{DOWN}$ may depend on aspect ratios of, respectively, the Wide and STIs displayed to a user. The values of $ZF_{UP}$ and/or $ZF_{DOWN}$ in a digital image-stabilized video mode may be 5%-30% larger than the values of $ZF_{UP}$ and/or $ZF_{DOWN}$ in a non-image-stabilized video mode.

In some examples, in a digital image-stabilized video mode, an image stabilization capability at a center POV may be 5%-30% larger than an image stabilization capability at a margin POV.

In some examples, the smooth transition may be achieved by cropping the STIs such that a particular position of a selected object in the cropped STI displayed to the user in two consecutive images of the video image stream does not vary by >10 pixels. In some examples, the particular position of the selected object may not vary by >5 pixels. In some examples, the particular position of the selected object in the cropped scanning Tele image displayed to the user may be selected according to aesthetic criteria.

In some examples, the camera controller may additionally configured to evaluate a non-switching criterion before the switching from displaying WIs to displaying STIs, and, if the non-switching criterion is met, not to switch from displaying WIs to displaying STIs. The non-switching criterion may be selected from a group consisting of a motion blur, electronic noise, a rolling shutter, a defocus blur and an incorrect image alignment or obstruction. The non-switching criterion may include a significant mis-location of a ROI in the STI with respect to its position in a WI or absence of the ROI in the STI; an imperfect roll correction of the STI; a check to determine if target coordinates are included in a scanning FOV of the STC (s-$FOV_T$); a check to determine if target coordinates are close to margins of the s-$FOV_T$ to prevent jumping back and forth between the WI and the STI; or a check to determine if target coordinates move faster than an expected maximum prism scanning velocity.

A zoom camera as above or below may be included in a smartphone.

In some examples, there is provided a method, comprising: using a Wide camera with a $FOV_W$ to output WIs; using a STC with a n-$FOV_T$ narrower than $FOV_W$ to output STIs; and configuring a camera controller operatively coupled to the Wide camera and to the STC to stream a video image stream that displays a continuous zoom-in action into, or a continuous zoom-out action out off a non-center area within $FOV_W$, and to provide the video images with a smooth transition when switching from displaying the WIs to displaying the STIs or vice versa.

BRIEF DESCRIPTION OF THE DRAWINGS

Non-limiting examples of the presently disclosed subject matter are described below with reference to figures attached hereto that are listed following this paragraph. Identical structures, elements or parts that appear in more than one figure may be labeled with the same numeral in the figures in which they appear. The drawings and descriptions are meant to illuminate and clarify embodiments disclosed herein, and should not be considered limiting in any way.

DETAILED DESCRIPTION

Figure 1:
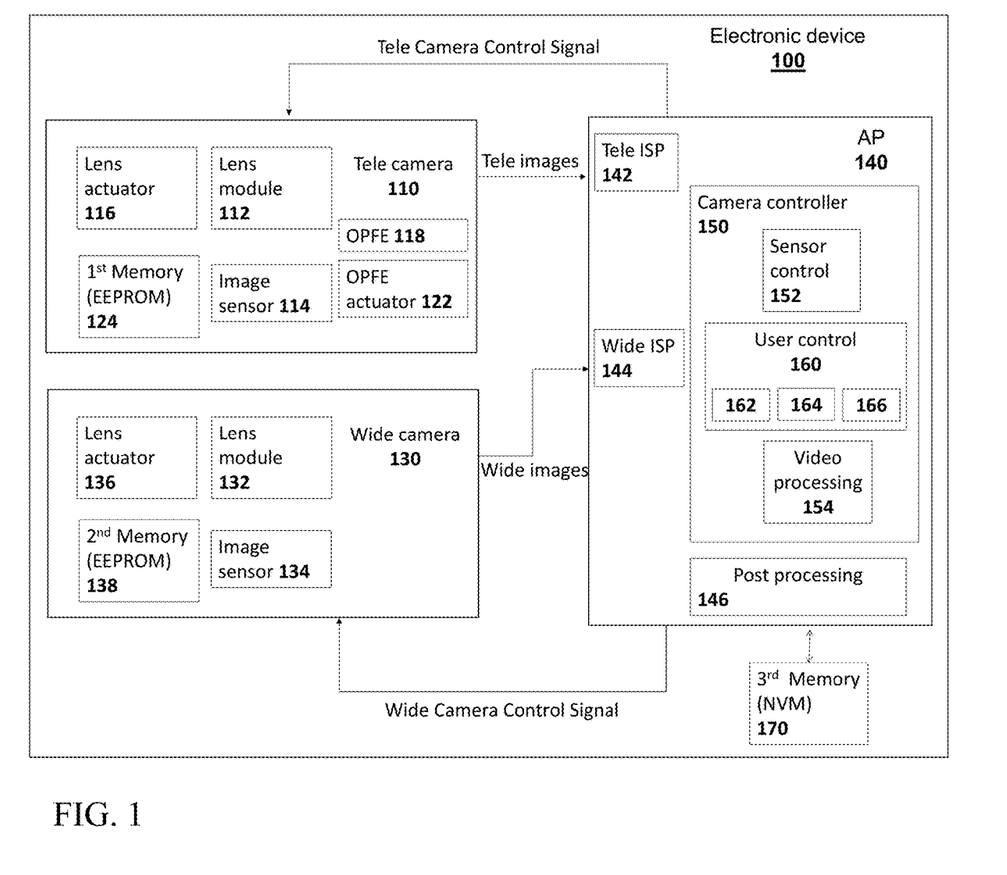
FIG. 1 shows schematically an embodiment of a mobile device that includes multi-cameras as disclosed herein.

FIG. 1 shows schematically an embodiment of mobile device numbered 100 (e.g. a smartphone) that includes a dual-camera. The dual-camera comprises a scanning Tele camera ("STC") 110 with a given native $FOV_T$ ("n-$FOV_T$") and an effective or scanning $FOV_T$ ("s-$FOV_T$"). STC 110 may be a folded camera that includes an OPFE 118, a Tele lens module 112 with a Tele lens, and a Tele image sensor 114. The Tele lens may have a fixed effective focal length (EFL) providing a fixed zoom factor (ZF), or an adaptable (variable) EFL providing an adaptable ZF. The adaption of the EFL may be discrete or continuous. STC 110 further comprises a lens actuator 116 for moving lens module 112 for focusing and/or optical image stabilization (OIS), an OPFE actuator 122 for actuating OPFE 118 for OIS and/or for scanning n-FOV$_T$ to a particular point-of-view (POV) within s-FOV$_T$, and a first memory 124. Memory 124 may be an EEPROM (electrically erasable programmable read only memory). In some embodiments, first memory 124 may store first calibration data. STC 110 may have an EFL of e g 8 mm-50 mm or more, a diagonal n-FOV$_T$ of 10-40 deg, and a f number of about f/#=1.5-6.

The n-FOV$_T$ scanning occurs with a finite maximum velocity, i.e. it requires some settling time. N-FOV$_T$ scanning may performed on a time scale of about 1-30 ms for scanning 2°-5° and about 10-80 ms for scanning 10-25°. In some embodiments, s-FOV$_T$ may cover about 50% of the area of FOV$_W$. In some embodiments, the s-FOV$_T$ may cover about 100% or even more of the area of FOV$_W$.

In some embodiments, the n-FOV$_T$ scanning may be performed by actuating two or more OPFEs instead of a single OPFE, as described for example in the co-owned international patent application No. PCT/IB 2021/059843.

The dual-camera further comprises a Wide camera ("WC") 130 with a FOV$_W$ larger than the n-FOV$_T$ of STC 110. WC 130 includes a Wide lens module 132 with a Wide lens and a Wide image sensor 134. A second lens actuator 136 may move lens module 132 for focusing and/or OIS. In some embodiments, second calibration data may be stored in a second memory 138. In other embodiments, the first calibration data and the second calibration data may be stored in a third memory 170. The first and second calibration data may comprise calibration data between WC 130 and STC 110. The WC may have an EFL of e.g. 2.5-20 mm, a diagonal FOV of 50-130 deg and a f/# of about 1.0-2.5.

Mobile device 100 may further comprise an application processor (AP) 140. AP 140 may comprise a Wide image signal processor (ISP) 144 and a Tele image ISP 142. AP 140 may further comprise a camera controller 150 having a sensor control unit 152, a user control unit 160, a video processing unit 154 and a post-processing unit 146, all operationally coupled to image sensors 114 and 134. User control unit 160 may comprise an operational mode choice function 162 used to select whether to capture images or videos, a region of interest (ROI) function 164 used to select a ROI, a ROI's "target coordinates" or its particular POV ("particular POV" and "target coordinates" being used interchangeably in the following), and a zoom factor (ZF) module 166 used to select a ZF. The ROI may be a segment within FOV$_W$ or s-FOV$_T$ that is selected by a user or by an algorithm. The ROI may have a higher value to a user than other segments, e.g. because it contains particular objects or a particular composition of objects. In general, a WC is focused to one of the ROIs and a STC is steered towards and/or focused to one of the ROIs.

In use, AP 140 may receive respective Wide and STC image data from cameras 110 and 130 and supply camera control signals to cameras 110 and 130.

Sensor control unit 152 is operationally coupled to the two ISPs (142 and 144) and to the user control unit 160, and may be used to choose, according to the zoom factor, which of the image sensors is operational and to provide sensor control signals. Video processing unit 154 may be configured to evaluate no-switching criteria to make a decision regarding a video output. Specifically, upon evaluation of a no-switching criterion, if the no-switching criterion is fulfilled, module 154 may be configured to output a zoom video output image that includes only Wide image data in a zoom-in operation. Post processing module 146 may be used for image processing that may include denoising, sharpening, scaling, etc.

Here and in the following, and if not stated otherwise, we use the following definitions:
  Input image: image as provided by a Tele ISP 142 or a Wide ISP 144.
  Scanning Tele image (STI): image as provided by a Tele ISP 142.
  Wide image (WI): image as provided by a Wide ISP 144.
  Output image: image as displayed to a user (in general as a particular image of a video stream).
  Tele output image: output image based on STI data and as provided in step 608 (FIG. 6) or step 708 (FIG. 7).
  Wide output image: output image based on WI data and as provided in step 608 (FIG. 6) or step 708 (FIG. 7).
  Output image data switching: in an image video stream, the action of switching from displaying to a user Tele output images or Wide output images to, respectively, displaying Wide output images or Tele output images to the user.
  Hereinafter, "image data" and "image" or "images" are used interchangeably.

Zoom-In and Zoom-Out in Still Camera Mode

We define the following: TFOV=tan (camera FOV/2). "Low ZF" refers to all zoom factors that comply with ZF<TFOV$_W$/TFOV$_T$. "High ZF" refers to all ZFs that comply with ZF>TFOV$_W$/TFOV$_T$. "Transfer ZF" or "ZFT" refers to a ZF that complies with ZF=TFOV$_W$/TFOV$_T$. ZFT represents a smallest ZF that allows output image data switching. In one embodiment, zoom-in and zoom-out in still mode may be performed as follows:

Zoom-in: at low ZF up to slightly above ZFT, the output images are digitally zoomed Wide output images. At an up-transfer ZF ("ZF$_{UP}$"), ZF$_{UP}$≥ZFT, the STI is shifted and corrected as described herein to achieve smooth transition ("ST") when output image data switching is performed, from displaying Wide output images to displaying Tele output images. For a ZF≥ZF$_{UP}$, the output are Tele output images that are digitally zoomed.

Zoom-out: at high ZF down to slightly above ZFT, the output images are digitally zoomed Tele output images. At a down-transfer ZF ("ZF$_{DOWN}$"), ZF$_{DOWN}$≥ZFT, the WI is shifted and corrected such as described herein to achieve ST when output image data switching is performed from displaying Tele output images to displaying Wide output images. For a ZF≤ZF$_{DOWN}$, the output are digitally zoomed Wide output images.

"Slightly above ZFT" may refer to a ZF that is higher by about 1%-25% than ZFT.

In some examples, a global registration algorithm may be used to achieve ST.

In some embodiments, ZF$_{UP}$ and/or ZF$_{DOWN}$ may be fixed ZFs, and ZF$_{UP}$≤ZF$_{DOWN}$ or ZF$_{UP}$≥ZF$_{DOWN}$.

In other embodiments, ZF$_{UP}$ and/or ZF$_{DOWN}$ may not be fixed ZFs, but they may vary ("dynamic transfer ZF"), e.g. in dependence on a POV or target coordinates (i.e. on the position of n-FOV$_T$ within s-FOV$_T$), i.e. ZF$_{DOWN}$=ZF$_{DOWN}$(x,y) and/or ZF$_{UP}$=ZF$_{UP}$(x,y), "(x,y)" representing a coordinate or POV within s-FOV$_T$.

In some embodiments, ZF$_{DOWN}$ may be smaller in a center region of s-FOV$_T$ than in a margin region of s-FOV$_T$, i.e. $ZF_{DOWN}$(center region)<$ZF_{DOWN}$(margin region). "Center region" and "margin region" are defined to be mutually exclusive. In an example and with reference to s-$FOV_T$ 200 shown in FIG. 2, a center region may be defined by all POVs that point into a rectangular box having the same height-width ratio and the same center as s-$FOV_T$ 200, but only 50% of s-$FOV_T$ 200's height and width respectively. Any POV pointing into s-$FOV_T$ 200 but not pointing into the center region is included in the margin region. In other examples, the rectangular box may only have 30% of s-$FOV_T$ 200's height and width respectively, or it may have as much as 80% of s-$FOV_T$ 200's height and width respectively, with the definitions of center region and margin region changing accordingly. In a STC based on a single OPFE, a STI captured in a center region of s-$FOV_T$ includes a larger FOV segment in an object domain than a STI captured in a margin region. This because for obtaining an e.g. rectangular rectified STI having a particular aspect ratio from a non-processed (i.e. non-corrected, uncropped etc.) STI at a center position within s-$FOV_T$, a lower amount of cropping is required (i.e. less scene information is lost) than for obtaining a rectangular rectified STI having a same particular aspect ratio from a non-processed STI at a margin position within s-$FOV_T$. The object domain is defined as the actual (or physical) scene, i.e. as the scene that is captured by an ideal camera having a sufficiently large FOV and not having any aberrations and distortions. That is, the object domain corresponds to the appearance of the scene as it may appear to a human observer. Therefore, $ZF_{UP}$ and $ZF_{DOWN}$ in a center region can be smaller than in a margin region.

An advantage of using dynamic transfer ZFs is that at least in a center region of s-$FOV_T$, the image quality benefits of using the STC can be enjoyed at a lower ZF. Using dynamic up- and down transfer ZFs may be especially beneficial in stills photography mode. In some embodiments with fixed or dynamic $ZF_{UP}$ and/or $ZF_{DOWN}$, the values of $ZF_{UP}$ and/or $ZF_{DOWN}$ in a video photography mode (i.e. when a user captures a video stream) may be larger by 5%-30% than the values of $ZF_{UP}$ and/or $ZF_{DOWN}$ in a stills photography mode. In some embodiments, the values of $ZF_{UP}$ and/or $ZF_{DOWN}$ may depend on an aspect ratio of the Wide output images and/or Tele output images.

In some embodiments where $ZF_{UP}=ZF_{UP}(x,y)$, $ZF_{UP}$ (center region)<$ZF_{UP}$(margin region). In some embodiments, $ZF_{UP}$ may be fixed and $ZF_{DOWN}$ may be dynamic, i.e. $ZF_{DOWN}=ZF_{DOWN}(x,y)$. A fixed $ZF_{UP}$ may fulfill $ZF_{UP} \geq [ZF_{DOWN}(x,y)]_{MAX}$, i.e. the fixed $ZF_{UP}$ is defined by the maximum $ZF_{DOWN}(x,y)$, which is the maximum $ZF_{DOWN}$ when considering all POVs within s-$FOV_T$. This may be beneficial, as it prevents scenarios where output image data switching from STIs to WIs need to be performed even though there is no change in ZF. An example for such an undesired scenario involves tracking of a moving object with the STC after output image data switching from WIs to STIs at target coordinates at a center position (where $ZF_{UP}$ can be smaller than in a margin region). The object (i.e. the target coordinates) may now move to a more margin position within s-$FOV_T$, where the FOV defined by the respective ZF cannot be supported with STIs anymore, because the n-$FOV_T$ at this margin position is not sufficiently large. Because of the incomplete STI data, output image data switching from STIs to WIs needs to be performed, although there is no change in ZF. Using a fixed $ZF_{UP}$ that fulfills $ZF_{UP} \geq [ZF_{DOWN}(x,y)]_{MAX}$ may be especially beneficial in a video mode.

Smooth Transition

For achieving ST, matching the position, scale, brightness and color of output images may be performed before and/or after output image data switching. However, image position matching between entire WIs and STIs is in many cases impossible, for example because of parallax. Therefore, in a smooth transition as disclosed herein, position matching may be achieved only in the ROI region, while scale brightness and color are matched for the entire output image area. Specifically, STIs may be shifted relative to WIs according to a distance of an object in a STI ROI when switching from displaying WIs to displaying STIs, and/or by shifting WIs relative to STIs according to a distance of an object in a WI ROI when switching from displaying STIs to displaying WIs.

Figure 2:
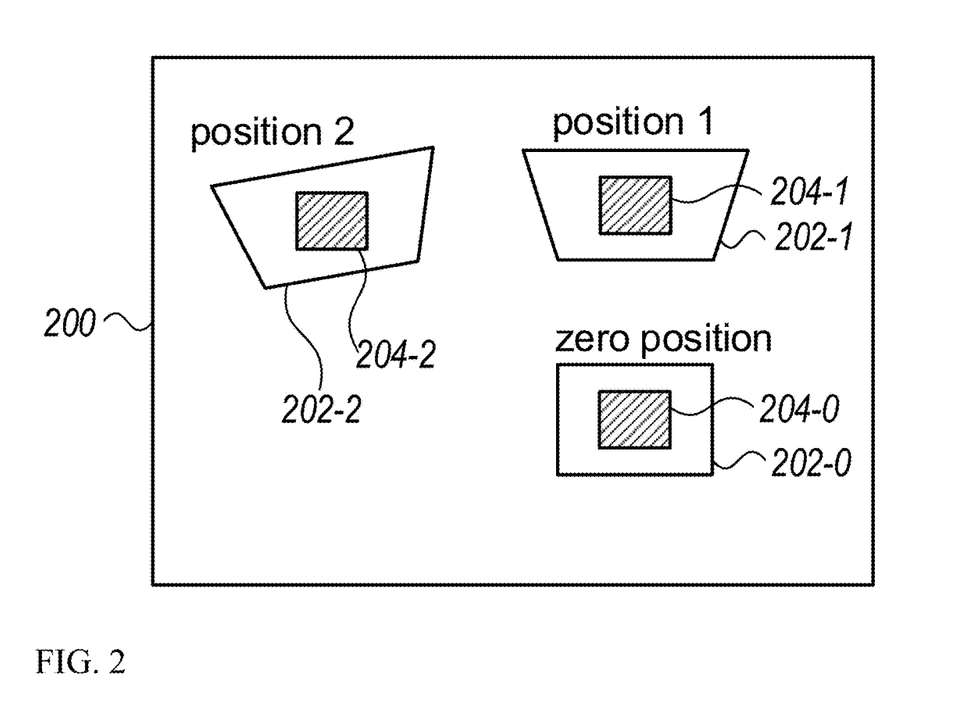
FIG. 2 shows different OPFE positions and their respective FOVs in an object domain.

FIG. 2 shows different OPFE positions and their respective n-$FOV_T$s in an object domain, as described in more detail in PCT/IB2021/056311. The object domain is differentiated from an "image domain", which is defined as the scene captured by a camera having aberrations and distortions. In this disclosure, the image domain is defined as a scene captured by a STC such as camera 110. Box 200 represents s-$FOV_T$, i.e. a smallest rectangular FOV that includes all STC image data from all POVs that can be reached with a particular STC in the object domain. The n-$FOV_T$s for three different OPFE positions (0, 1 and 2) are represented by 202-0, 202-1 and 202-2. The n-$FOV_T$ for an OPFE "zero position" 202-0 is defined as the n-$FOV_T$ that produces an image of an object or scene without POV aberrations. That is, at zero position an object in the object domain is identical to the object image in the image domain (except scaling, image sensor noise etc.). In general, in the zero position the center of n-$FOV_T$ and $FOV_W$ overlap. As shown, the n-$FOV_T$ at any other position (e.g. 202-1 and 202-2) is not a horizontal rectangle (like 202-0), but an arbitrary tetragon. The same rectangular object is represented by 204-0, 204-1 and 204-2 in, respectively, n-$FOV_T$s 202-0, 202-1 and 202-2.

Figure 3:
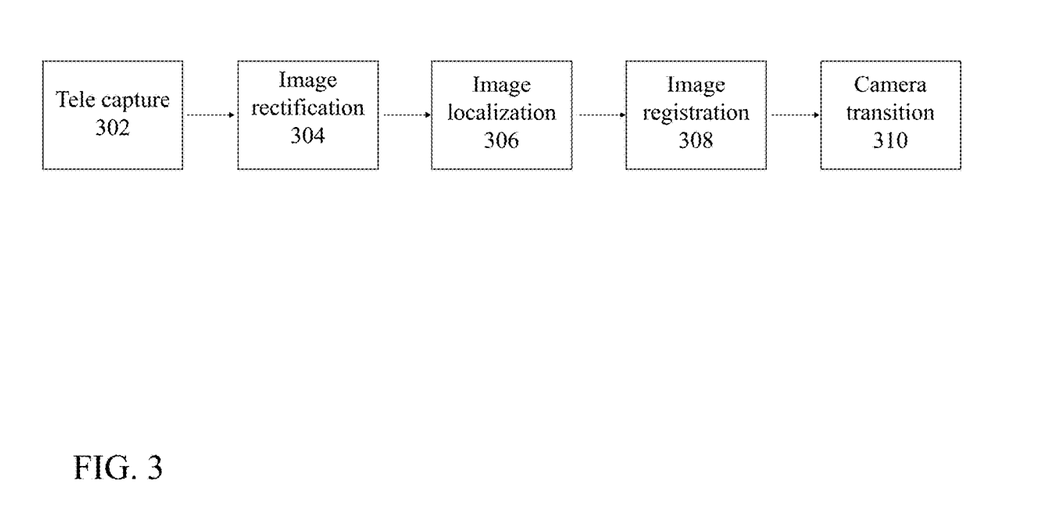
FIG. 3 shows in a flow chart main steps of a method for locating a STC image within a Wide image as disclosed herein.

FIG. 3 shows main steps of a method for locating a STI within a WI as disclosed herein. A STI is captured in step 302. Prior to the capture, n-$FOV_T$ is scanned toward a particular POV. The STI is rectified in step 304, as described in international patent application PCT/IB2021/056311. By using suitable crop selection criteria, one is able to manipulate the content included in the corrected and cropped STI as well as the location of objects within the corrected and cropped STI. Crop selection criteria refer to particular criteria for correcting and cropping a particular STI captured at a particular n-$FOV_T$. The cropping includes defining a crop offset and/or a crop center and/or a crop factor. A crop offset is a position of the top left corner of an image in the object domain. A crop factor is given in general by 1/ZF.

In some examples, one may modify the cropping so that a selected object is included in the cropped STI.

In other examples, one may modify the cropping so that a selected object is located at a particular position in the cropped STI.

In some examples and for video mode, one may modify the cropping so that a position of a selected object in two consecutive frames of a video stream does not vary by more than 10% or 5% or 1% of a width and/or height of the Tele sensor.

In other examples, the position of a selected object in two consecutive frames may vary by less than 50 pixel or less than 20 pixel or by even less than 5 pixel (assuming a pixel size of 1 um).

In yet other examples, one may modify the cropping so that a location of a selected object in consecutive frames of a video stream varies only slowly, e.g. vary at a frequency no higher than 10 pixel/s or 5 pixel/s or even 2 pixel/s (assuming a pixel size of 1 um).

In yet other examples, one may modify the cropping so that a location of a selected object satisfies aesthetic criteria. Aesthetic criteria may be based for example on the location of a selected object in the cropped STI ("aesthetic framing") as see e.g. photographer's "rule of thirds", whether additional objects are included or excluded in the cropped STI as see e.g. photographer's "rule of leading lines", etc. Localization of the STI within the WI is performed in step 306, for example as described in FIG. 4A-B. Image registration between the cropped STI and the WI as known in the art is performed in step 308. Output image data switching may be performed in step 310, as outlined in more detail below. The same steps may be performed for a zoom-out case, where one may switch from Tele output image data to Wide output image data. In some examples, the switching step may include blending or fusing of STIs and WIs.

Figure 4A:
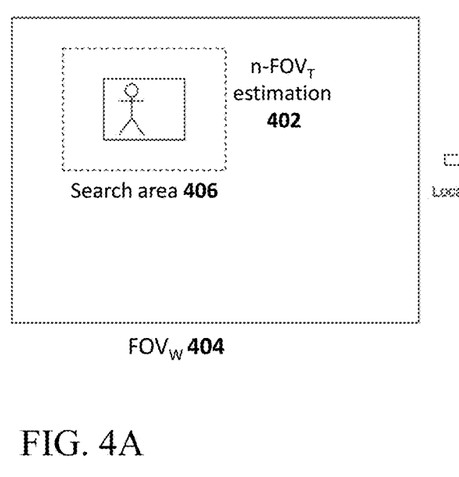
FIG. 4A shows the localization of the T image within the W image in one view.
Figure 4B:
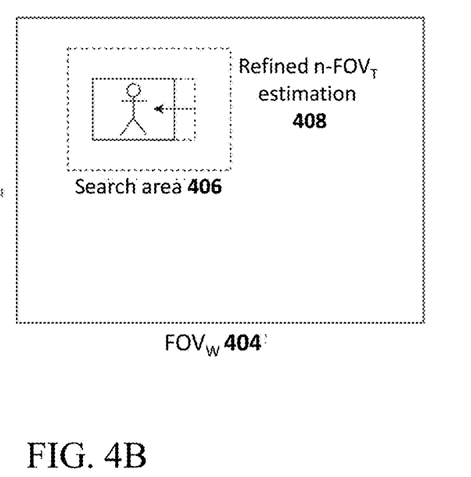
FIG. 4B shows the localization of the T image within the W image in another view.

FIG. 4A-B shows details of the localization of a STI within a WI performed in step 306, as also described in more detail in co-owned international patent application PCT/IB2020/061461.

In FIG. 4A, n-$FOV_T$ estimation 402 is shown at an estimated POV within $FOV_W$ 404. An estimated POV refers to a POV as estimated from calibration data. The n-$FOV_T$ estimation is calibration dependent and may be insufficiently accurate in terms of matching STIs with WIs. Typically, before localization, image point coordinates of a same object point in a STI and WI may deviate by more than 25, 50 or even 100 pixels. We assume a pixel size of about 1 μm. The localization (step 306) is performed to decrease this deviation, i.e. to achieve a refined n-$FOV_T$ estimation with improved accuracy. The localization includes:

1. Selecting a search area 406 as shown in FIG. 4A. Search area 406 may be defined by using the center of the n-$FOV_T$ estimation, and to (e.g. symmetrically) embed it in a rectangular area, wherein the rectangular area may be twice or three times or four times the area covered by the n-$FOV_T$ estimation.
2. Cropping the search area from a WI.
3. Template matching, wherein a source is represented by the cropped search area from a WI and a template may be represented by a STI. The template matching may be performed by cross-correlation of the template over different locations of the search area or over the entire search area. The location with a highest matching value may indicate a best estimation of n-$FOV_T$'s location within $FOV_W$. This more accurate refined n-$FOV_T$ estimation is indicated in FIG. 4B as 408 and may be further used to perform steps 308 and 310. Typically, after the localization, image points of a same object point may deviate by less than 5 pixels or even by less than 2 pixels between a WI and a STI, i.e. an accuracy is improved by a factor 5, 10 or even 20.

Figure 5A:
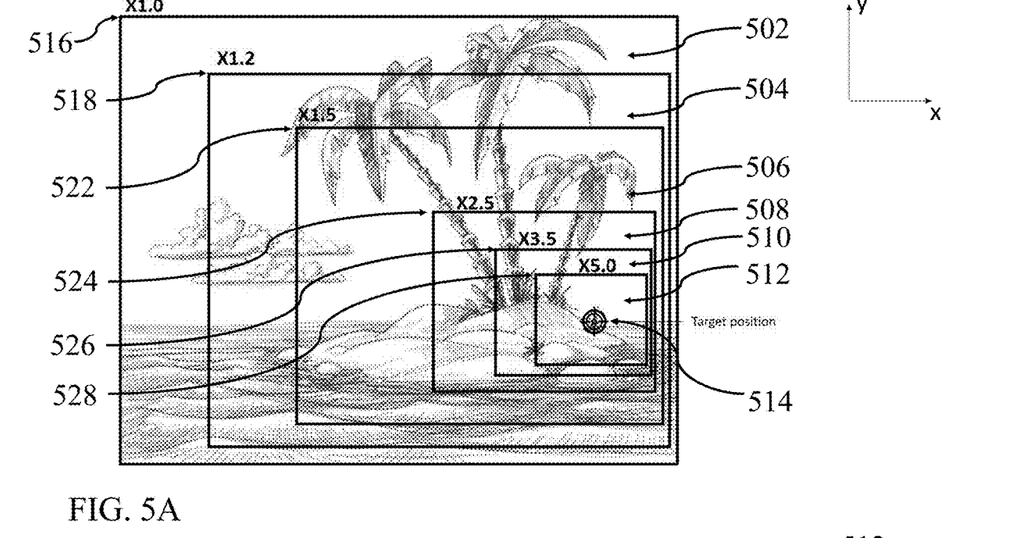
FIG. 5A shows a zoom-in scenario displayed in a smooth transition video sequence created by a first method embodiment.
Figure 5B:
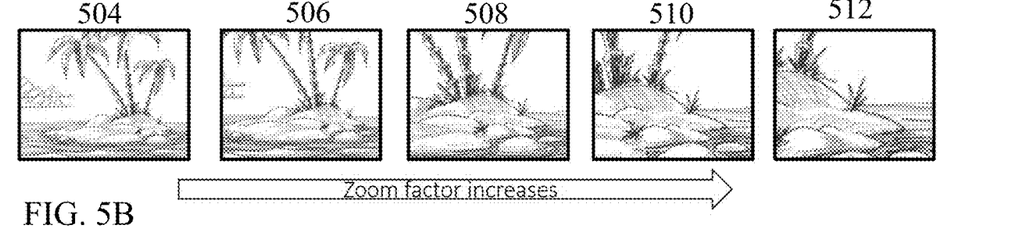
FIG. 5B shows images in the zoom-in scenario of FIG. 5A, zoomed digitally such that they have the same width/height ratio.
Figure 5C:
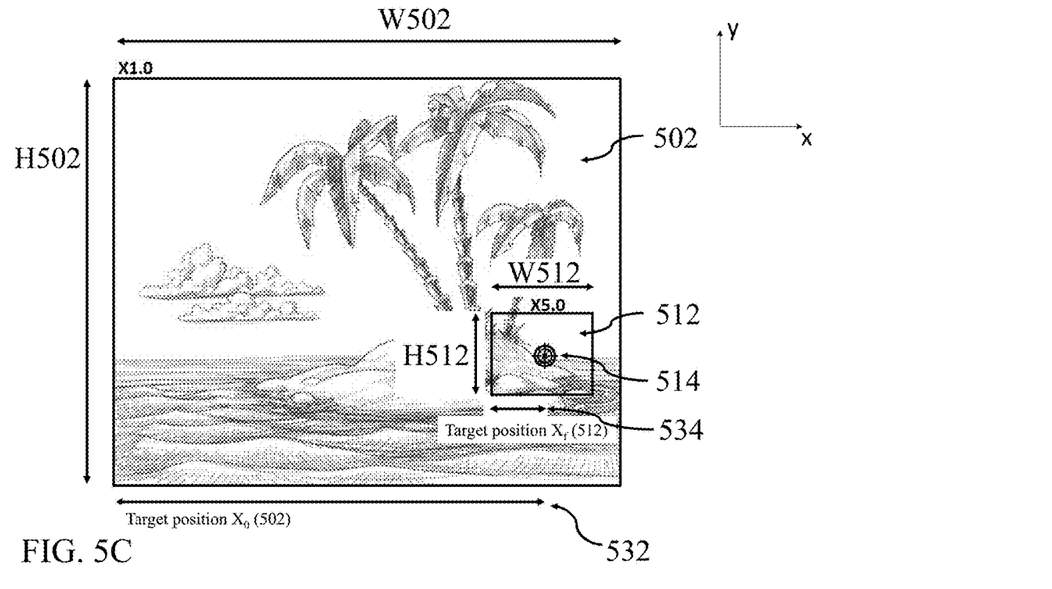
FIG. 5C shows some of the images in FIG. 5B and a target position.

FIG. 5A-C illustrates a ST video sequence created by a first crop method ("method 1") disclosed herein. In the following, index "0" refers to an initial state, index "f" refers to a final (or target) state and index "t" refers to some intermediate state. "State" refers to an image defined by a ZF, a crop factor and a crop offset. "Final state" refers to a last image displayed in a ST video sequence that includes Wide output image data. Output image data switching may be performed when further zooming-in.

FIG. 5A shows how a zoom-in scenario is displayed in a ST video sequence created by method 1. Image 502 may represent a first image in the ST video sequence. Image 502 may have a ZF=1.0, i.e. it includes an entire $FOV_W$ or it may have a ZF>1. Images 504-512 represent subsequent images in the ST video sequence towards a "target" position 514 with coordinates ($x_f$, $x_f$) and a target ZF ("$ZF_f$"). Target position 514 is the position towards which the zoom-in is directed. An STC's n-$FOV_T$ is scanned such that target position 514 is located at the n-$FOV_T$'s center. Position 514 and $ZF_f$ may be selected by a user or by a program before or at the beginning of the zoom-in action. Images 504-512 are Wide output images. Crop offsets of images 504-512 are indicated by image frames 516-528 respectively. An advantage of method 1 is that cropping is selected such that target position 514 is included in each of the images 502-512, i.e. target position 514 is displayed in the entire ST video sequence.

FIG. 5B shows images 504-512 as subsequently displayed to a user in a zoom-in ST video sequence, i.e. they are zoomed digitally such that they have a same width/height ratio.

FIG. 5C shows image 502, image 512 and target position 514. Numeral 532 represents the initial X-coordinate $X_0$ of target position 514 in the coordinate system of image 502, and numeral 534 represents the target X-coordinate $X_f$ of target position 514 in the coordinate system of image 512. Y-coordinates $Y_0$ and $Y_f$ are defined accordingly. Target position 514 is defined in the object domain. Widths and heights of images 502 and 512 (measured along the x axis and the y axis respectively) are given by W502 and W512 and H502 and H512 respectively. Relative positions ("rel-$Pos_{0,x}$") and ("rel$Pos_{f,x}$") can be derived from 532 and 534 by rel$Pos_{0,x}$=$X_0$/W502 and rel$Pos_{f,x}$=$X_f$/W512. Relative positions in the Y direction may be defined accordingly. The smooth transition is achieved by gradually modifying the relative coordinates of the target position, for both X and Y axes. At target $ZF_f$, the relative position of target position 514 is rel$Pos_{f,x}$=rel$Pos_{f,y}$=½, i.e. target position 514 coincides with the output image center.

Method 1 may be used similarly for zoom-out.

Figure 6:
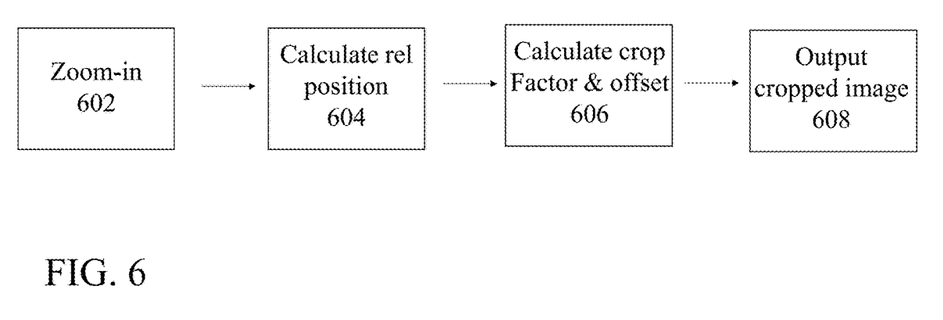
FIG. 6 shows in flow chart with main steps of a crop method.
Figure 7:
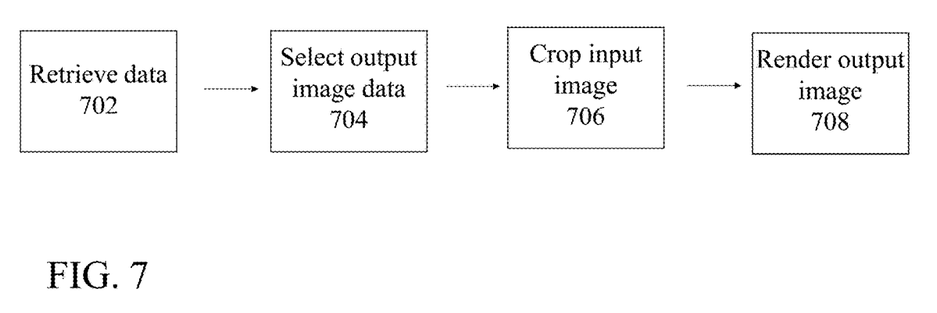
FIG. 7 shows another embodiment of a method disclosed herein for achieving a smooth-transition experience in multi-cameras comprising at least one camera with a scanning capability.

FIG. 6 shows main steps of method 1. One may start at an initial (or "0") state with a $ZF_0$<ZFT and with a video stream that displays Wide output images such as images 502-512. A localization of n-$FOV_T$ within $FOV_W$ such as described in FIGS. 4A-B is performed.

In general, the relative position at some intermediate state ("t") may be calculated according to rel$Pos_t$=($X_t$/$W_t$, $Y_t$/$H_t$), where $W_t$ and $H_t$ are respectively the width and height of an output image displayed at intermediate state t, and where $W_t$=W/$ZF_t$ and $H_t$=H/$ZF_t$ define a crop factor, where W and H are respectively the width and height of an uncropped WI.

An initial state relative position rel$Pos_0$ is calculated from target coordinates ($X_0$, $Y_0$) in the coordinate system of image 502 as rel$Pos_0$=($X_0$/$W_0$,$Y_0$/$H_0$), where $W_0$=W/$ZF_0$ and $H_0$=H/$ZF_0$ are respectively the width and height of the output image displayed at initial state 0. A transition slope S for transition from rel$Pos_0$ to a relative position in the target state rel$Pos_f$ is derived by $$S = \frac{relPos f - relPos 0}{ZFP - ZF0}$$

where $ZF_P$ is a pre-set and fixed ZF value which fulfills $ZF_P$>$ZF_T$.

In step 602, a program or user triggers a command for zoom-in to a first intermediate state ("t1") with a ZF $ZF_{t1}$, wherein $ZF_{t1}>ZF_T$, such that output image data switching (from Wide to STC image data) may be performed. The initial output image may be an image that displays the entire $FOV_W$ (i.e. having $ZF_0=1$), or it may be an image having $1<ZF_0<ZFT$ that displays a (digitally zoomed) segment of $FOV_W$.

In step 604, the relative position update is calculated according to $relPos_{t1}=relPos_0+(ZF_{t1}-ZF_0)\cdot S$. In general, a relative position update may be $relPos_t=relPos_{t-1}+(ZF_t-ZF_{t-1})\cdot S$.

In step 606, the crop factor and crop offset are calculated. A crop offset $(X_C,Y_C)$ is calculated by first calculating the relative coordinates as follows: $X_{t1}=relPos_{t1,x}\cdot W_{t1}$ and $Y_{t1}=relPos_{t1,y}\cdot H_{t1}$, where $relPos_{t,x}$ and $relPos_{t,y}$ are the x value and y value of $relPos_t$ respectively. The crop offset's location $(X_C,Y_C)$ is calculated by subtracting $X_{t1}$ and $Y_{t1}$ from the target coordinates (in the coordinate system of image t1).

In step 608, an image based on WI data and cropped according to the crop offset $(X_C,Y_C)$ and having an image size $(W_t, H_t)$ is output and displayed in the ST video sequence. If further zoom-in is performed, the flow may start again from step 602.

In some examples, a following output image data switching may be from only using a WI input to only using a STI input.

In a second crop method ("method 2"), the ST may be achieved by modifying the crop offset linearly. One may think of a linear connection between the initial crop offset $(X_{C,0},Y_{C,0})$ and the target crop offset $(X_{C,f},Y_{C,f})$. In method 2, when zooming-in or zooming-out, the crop offset always comes to lie on this linear connection, as shown in FIG. 5A. In some examples, the location where the crop offset comes to lie on the linear connection is determined linearly. In other examples, the location is determined by a square law. For example, a difference in the location of the crop offset (i.e. a distance between the respective crop offsets) on the linear connection is 2 times larger when zooming from ZF=1 to ZF=2 than when zooming from ZF=2 to ZF=4.

In a third crop method ("method 3"), the ST may be achieved by modifying the center of the FOV shown in the ST video stream linearly. One may think of a linear connection between the initial FOV center and the target FOV center. In method 3, when zooming-in or zooming-out, the FOV center may always come to lie on this linear connection. The location where the crop offset comes to lie on the linear connection may be determined by a linear law or by a square law.

FIG. 7 shows an embodiment of a ST method disclosed herein. For each image of a video stream, Wide and Tele input images and a STC's POV are retrieved in step 702. The Tele input image may be rectified beforehand to be aligned with the Wide POV, or be rectified in step 702. Optionally, in step 702 an OFPE position may be translated into a n-$FOV_T$ estimation using calibration data. For example, in case n-$FOV_T$ changed by scanning, a registration process may be executed to calculate the current STI's translation and rotation parameters with respect to WIs. The translation may compensate for the parallax, the rotation for the residual rotation between the STIs and WIs, which may be caused by imperfect calibration.

In some examples, a multi-camera may include image stabilization (IS) such as optical image stabilization (OIS) or electronic image stabilization (EIS) for the STC and/or the WC. Since the IS may shift WIs and STIs with respect to each other, IS control input data such as sensor data provided from an inertial measurement unit (IMU) or IS control output data such as commands to move a particular optical component by a given amount may be read in step 702. The data may be transformed to an expected pixel shift in the WIs and STIs, and the transformation may be used for compensating any undesired effects the IS mechanism may have on a ST video sequence. As known, for EIS, input images are cropped and shifted, so that a selected object or an entire scene remains located at a same (or at a similar) particular position in two or more consecutive output images of a video stream. To prevent jumping between STC and WC, values of $ZF_{UP}$ and/or $ZF_{DOWN}$ in a digital image-stabilized video mode may be 2.5%-50% larger than values of $ZF_{UP}$ and/or $ZF_{DOWN}$ in a non-image-stabilized video mode. Moreover, a capability of performing EIS, e.g. measured by a maximum number of pixels that can be shifted, may be larger by 2.5%-50% at a center POV than at a margin POV. Here, the IS may be used for achieving two different goals. The first goal may be to stabilize a WC or STC at high frequencies of about 50-100 Hz and higher, e.g. for mitigating a user's handshake. The first goal may be to robustly frame a scene, i.e. to stabilize a WC or STC on low frequencies of about 20 Hz and lower, e.g. 1 Hz, to maintain a selected scene (of the object domain) within, or at a particular position within $FOV_W$ or n-$FOV_T$. A Wide or a Tele input image is selected to be used as output image in step 704. Wide input image data may be selected for following cases:

for any low ZF, or for a high ZF, but where one or more non-switching criteria are fulfilled. Evaluating the non-switching criteria prevents output image data switching in situations where a ST cannot be achieved or may not be beneficial. The following non-switching criteria may be evaluated after STIs were captured:

1. Low STI quality. For example, the low image quality may be caused by large electronic noise as of low scene illumination, because the STC is out-of-focus ("defocus blur"), or because of motion blur, rolling shutter artifacts or other artifacts known in the art.

2. Non-suitable STI composition. For example, this may include a scenario (i) where the STI shows a scene significantly different from the scene shown in a WI that is to precede the STI in the ST video stream output to a user, or a scenario (ii) where the STI shows a scene that is in significant semantic disagreement with the scene shown in the WI (e.g. as of motion occurring between the capture of the STI and the WI), or a scenario (iii) where the STI does not show a ROI that is included in the WI (e.g. as of obstructions), or it does show a ROI at a significant mis-location with respect to the WI (i.e. the target coordinates in a WC coordinate system differ significantly from the target coordinates in a STC coordinate system).

3. Imperfect STI correction, e.g. an imperfect roll correction of the STI.

The following non-switching criteria may be evaluated before STIs are captured or before n-$FOV_T$ is scanned to particular target coordinates:

1. Valid STC scan range: evaluates whether the target coordinates are included in s-$FOV_T$.

2. Prevent STC-WC jumping: evaluates whether the target coordinates are closer than some threshold to a margin of s-$FOV_T$. In such a case, even a small relative movement of the ROI and the STC may lead to a situation where the ROI cannot fully be covered by the STIs anymore, such that WIs must be used. To prevent this jumping between STC and WC, one may not switch to STI output data if target coordinates are located at a distance closer to 5% or 10% or 20% of the s-FOV$_T$ (in a horizontal or a vertical direction) to the margins of s-FOV$_T$.
3. Valid ROI velocity: evaluates the velocity of an ROI (and respective target coordinates) to analyze whether n-FOV$_T$ can follow this movement.

The input image selected as output image is cropped in step 706. Depending e.g. on the selected input image, the current ZF, the required image crop for the input image etc. is calculated. The calculation may be performed according to crop method 1, crop method 2, or crop method 3. The resulting cropped image may be displayed (or output) to a user.

Optionally, and depending for example on a) the selected input image, b) the cropping of the input image, and/or c) the image registration parameters, the ST output image may be rendered in step 708.

In other examples, a method disclosed herein may not include the action of cropping, but may only provide the parameters that are calculated as described herein, and the actions of steps 706 and 708 such as cropping, rendering the video, etc. may be performed on a different program or processor, e.g. on a dedicated hardware (HW) supporting HW acceleration.

For compensating resolution differences between STIs and WIs, one may apply a blurring on the output image.

A rotation correction may be applied in step 708 as well. Lens distortion discrepancy between WC and STC is another challenge. For ST, distortion correction may be applied to all input images, or alternatively, a digital distortion may be applied on only the Tele input images or on only the Wide input images such that they are matched to the respective other input images.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that elements.

All patents, patent applications and publications mentioned in this specification are herein incorporated in their entirety by reference into the specification, to the same extent as if each individual patent, patent application or publication was specifically and individually indicated to be incorporated herein by reference. In addition, citation or identification of any reference in this application shall not be construed as an admission that such reference is available as prior art to the present disclosure.

What is claimed is:

1. A zoom camera, comprising:
   a Wide camera with a Wide field of view (FOVW) and operative to output Wide images (WIs);
   a scanning Tele camera (STC) with a native scanning Tele FOV (n-FOVT) narrower than FOVW and operative to output scanning Tele images (STIs); and
   a camera controller operatively coupled to the Wide camera and to the STC and configured to stream a video image stream that displays a continuous zoom-in action into, or a continuous zoom-out action out off a non-center area within FOVW,
   wherein the video images are provided with a smooth transition when switching from displaying WIs to displaying STIs or vice versa, and wherein the switching from displaying STIs to displaying WIs is performed at a down-transfer ZF value (ZFDOWN) that depends on a point-of-view (POV) of the n-FOVT within the FOVW.

2. The zoom camera of claim 1, wherein ZFDOWN (center POV) is a down-transfer ZF value of a center POV within FOVW and ZFDOWN(margin POV) is a down-transfer ZF value of a POV in a margin region within FOVW, and wherein ZFDOWN(center POV)<ZFDOWN (margin POV).

3. The zoom camera of claim 1, wherein the switching from displaying WIs to displaying STIs is performed at an up-transfer ZF value (ZFUP), wherein the ZFUP does not depend on the POV of a native FOVT (n-FOVT) within FOVW, wherein [ZFDOWN(x,y)]MAX is a maximal value of ZFDOWN(x,y) for all possible POVs within a scanning FOV (s-FOVT) of the STC, and wherein ZFUP ≥ [ZFDOWN (x,y)]MAX.

4. A zoom camera, comprising:
   a Wide camera with a Wide field of view (FOVW) and operative to output Wide images (WIs);
   a scanning Tele camera (STC) with a native scanning Tele FOV (n-FOVT) narrower than FOVW and operative to output scanning Tele images (STIs); and
   a camera controller operatively coupled to the Wide camera and to the STC and configured to stream a video image stream that displays a continuous zoom-in action into, or a continuous zoom-out action out off a non-center area within FOVW,
   wherein the video images are provided with a smooth transition when switching from displaying WIs to displaying STIs or vice versa, wherein the switching from displaying WIs to displaying STIs is performed at an up-transfer ZF value (ZFUP), wherein the switching from displaying STIs to displaying WIs is performed at a down-transfer ZF value (ZFDOWN), and wherein the values of ZFUP and/or ZFDOWN in a video photography mode are 5%-30% larger than the values of ZFUP and/or ZFDOWN in a still photography mode.

5. A zoom camera, comprising:
   a Wide camera with a Wide field of view (FOVW) and operative to output Wide images (WIs);
   a scanning Tele camera (STC) with a native scanning Tele FOV (n-FOVT) narrower than FOVW and operative to output scanning Tele images (STIs); and
   a camera controller operatively coupled to the Wide camera and to the STC and configured to stream a video image stream that displays a continuous zoom-in action into, or a continuous zoom-out action out off a non-center area within FOVW,
   wherein the video images are provided with a smooth transition when switching from displaying WIs to displaying STIs or vice versa, wherein the switching from displaying WIs to displaying STIs is performed at an up-transfer ZF value (ZFUP), wherein the switching from displaying STIs to displaying WIs is performed at a down-transfer ZF value (ZFDOWN), and wherein the values of ZFUP and/or ZFDOWN in a digital image-stabilized video mode are 5%-30% larger than the values of ZFUP and/or ZFDOWN in a non-image-stabilized video mode.

\* \* \* \* \*